Jan. 28, 1941.  J. G. BLUNT  2,230,209
LOCOMOTIVE
Filed March 2, 1940  2 Sheets-Sheet 1
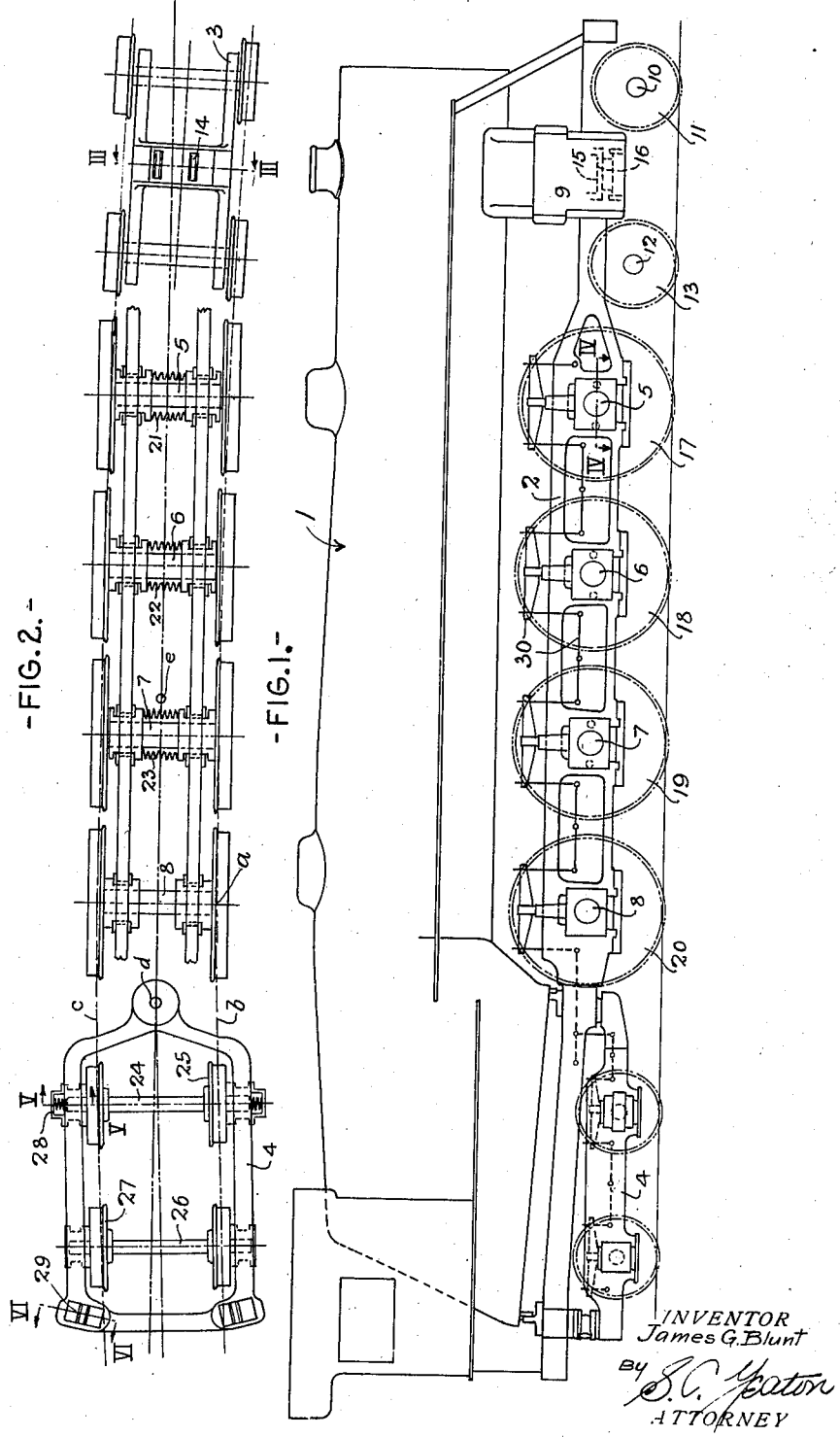
INVENTOR
James G. Blunt
BY
ATTORNEY Jan. 28, 1941.   J. G. BLUNT   2,230,209
LOCOMOTIVE
Filed March 2, 1940   2 Sheets-Sheet 2
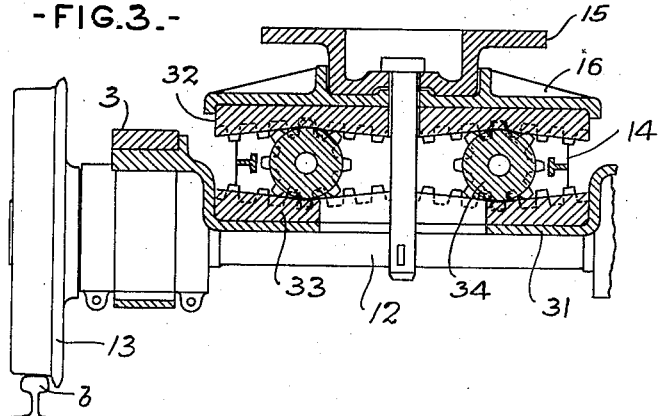
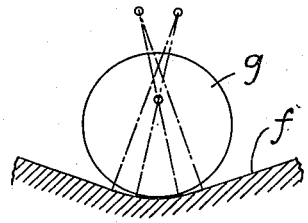
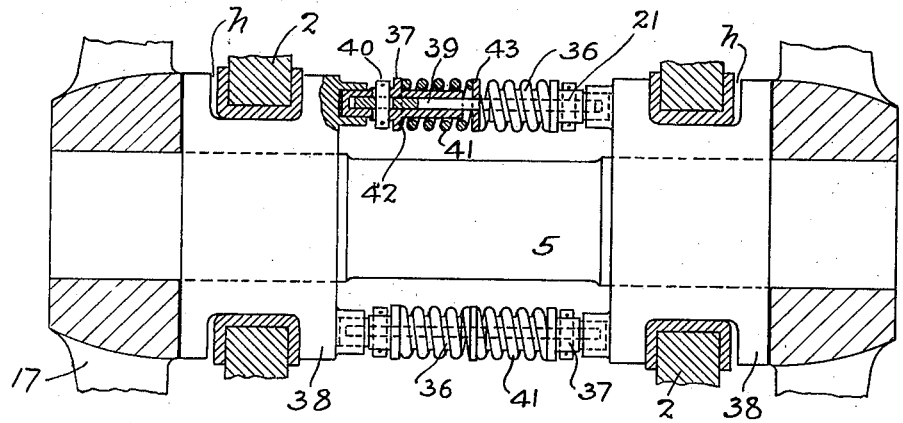
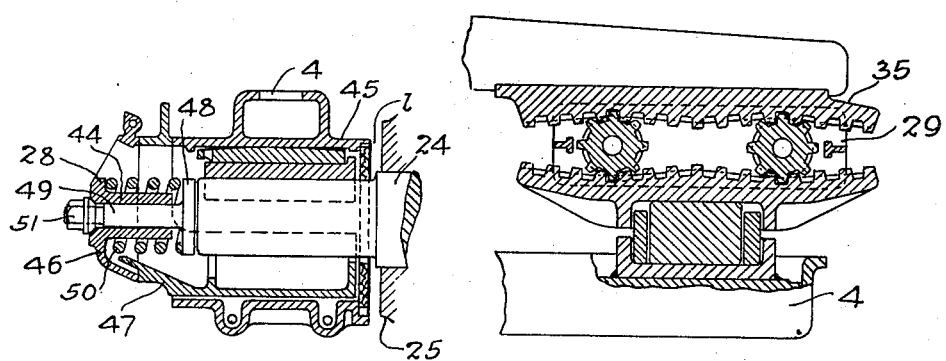
INVENTOR
James G. Blunt.
BY
ATTORNEY Patented Jan. 28, 1941

2,230,209

UNITED STATES PATENT OFFICE 2,230,209

LOCOMOTIVE

James G. Blunt, Schenectady, N. Y., assignor to American Locomotive Company, New York, N. Y., a corporation of New York Application March 2, 1940, Serial No. 321,854

9 Claims. (Cl. 105—37)

This invention relates to locomotives and more particularly to a locomotive having a relatively long rigid frame and a correspondingly long driving axle wheel base, the driving axles of which have no horizontal angular movement relative to each other or to the frame.

An object of the invention is to provide, in a locomotive of the aforementioned characteristics, means for accommodating the driving wheels for tracks of different curvatures whereby a forwardly moving locomotive will pass through tracks of sharp curvatures with substantially the same ease as is usual in passing through tracks having a curvature of long radius.

A further object is to provide means, in the aforesaid type of locomotive, permitting the locomotive, in its said passage through curved track, to travel at relatively high speeds without danger of derailment, track spreading, wheel binding or other similar undesirable occurrences.

A further object is to provide means by which a spring-suspended rigid main frame and its superstructure act together as a unit to form a lever, one of the driving axles of the locomotive providing the pivot point for forward movement, while all other driving axles have lateral resistance moving ranges relative to the lever structure, such that the lever can turn through the various degrees of track curvature, around the pivot point.

A further object is to provide means for obtaining lateral driving axle movements for all but the driving axle providing the pivot point, such that the tire setting of all driving wheels in the locomotive can be made to the maximum width suitable to tangent track, the lateral motion and lateral motion resistance devices provided permitting the driving wheels to pass freely through all curvature requirements.

Other and further objects of and advantages achieved by the invention will be apparent from the following description of an approved embodiment thereof.

Referring to the drawings, Figure 1 is a diagrammatic side elevation of a locomotive embodying the present invention, parts being shown in dot and dash lines; Fig. 2 is a diagrammatic view showing the relation of the truck and driving wheels to a curved track, the frame being shown fragmentally and the track being shown in dot and dash lines. Figs. 3-6 are enlarged fragmentary sectional views of portions of the locomotive showing lateral motion resistance devices preferably employed, Fig. 3 being a section on the line III—III of Fig. 2, parts being shown in full and other parts added, Fig. 4 a section on the line IV—IV of Fig. 1, parts being shown in full, Fig. 5 a section on the line V—V of Fig. 2, parts being shown in full, and Fig. 6 a section on the line VI—VI of Fig. 2; and Fig. 7 is a diagrammatic view, on an enlarged scale, of a roller and a lower roller seat of Figs. 3 and 6.

The invention is concerned with improving the action of a locomotive of the aforementioned type when it is moving forwardly through curved track, especially when it is passing through such track at a relatively high speed. In modern times locomotives have increased their speeds from a former maximum of 60 miles to 90 or more miles per hour. At such former low speeds the right-of-way and locomotive stresses were low and provision to meet such stresses was easily made. Stresses in the right-of-way as well as in the locomotive increase about as the square of the speed increases, from which it is easily recognized that with the increased speed demands of to-day, more improved structural means must be devised to safely overcome these mounting stresses. Under these higher speeds, to produce the utmost in the way of safe and smooth riding and the lowest stress conditions, in the right-of-way as well as in the locomotive, it is of the utmost importance to improve the guiding qualities, prevent nosing, dampen out vibrations, equalize and cushion the wheel flange pressures and perfect the moving mechanism so as to be free from detrimental wheel binding between rail and wheel hub, twisting and disalignment conditions. Careful solution of these problems prevents destructive concentration of operating stresses and distributes them more equally over the entire structure, resulting in a smooth gliding movement at higher speeds than are otherwise safe.

The present invention is shown in the drawings applied to a 4-8-4 type of locomotive, indicated generally by the reference numeral 1, in which a rigid one-piece through frame 2 is supported at its forward end by a four-wheel leading truck 3, at its rear end by a four-wheel trailing truck 4, and at its intermediate portion by the four driving axles 5, 6, 7 and 8 taken respectively from the front to the rear. The axles 5, 6, 7 and 8 form a relatively long wheel base, the driving axles of which have no horizontal angular movement relative to each other or to the frame, which driving axle wheel base, taken together with the axles of the leading and trailing trucks, forms the entire wheel base of the locomotive. For the purpose of the present description, the frame is considered to include the cylinder casting 9. The invention is applicable of course to other types of locomotives but the description will be limited, by way of example only, to the structure shown. The superstructure of the locomotive is rigid with the frame against relative lateral movement so that the two act together as a unit.

The leading truck has a forward axle 10 having wheels 11 and a rear axle 12 having wheels 13. A lateral motion resistance device 14 of the aligned roller type is disposed upon the bolster 31 beneath the center pin 15 and center plate 16 in the usual manner. The lateral motion resistance device may be of the type shown in my Patent No. 1,657,777, January 31, 1928.

The invention, as aforesaid, is devised for obtaining the end sought in a locomotive while moving in a forward direction. The driving axles 5, 6, 7, and 8 have respectively pairs of driving wheels 17, 18, 19 and 20. Axles 5, 6 and 7 are provided respectively with lateral motion resistance devices 21, 22 and 23, these axles having lateral movement relative to the frame. These latter lateral motion resistance devices may be of the type shown in my Patent No. 1,946,893, February 13, 1934. Axle 8 has no such lateral movement, and accordingly has no lateral motion resistance device. When it is stated that an axle has no lateral movement, in both the specification and claims, it will be understood that there is present the usual lateral working clearance.

The trailing truck has a forward axle 24 provided with wheels 25 and a rear axle 26 provided with wheels 27. A lateral motion resistance device 28, which may be of the type shown in my Patent No. 2,021,167, November 19, 1935, is associated with axle 24 and a different type of lateral motion resistance device 29 of the aligned roller type, which may be of the type shown in my Patent No. 1,920,348, August 1, 1933, is associated with the rear end of the trailing truck.

Referring more particularly to Figs. 3 to 7 inclusive, lateral motion resistance devices of well-known types, as aforesaid, are here shown which are each capable of offering a predetermined initial preferably low resistance and thereafter increasing resistance as the lateral movement increases, also these resistances may be greater in one device than in another in a predetermined and desirable manner, all as will presently appear.

Fig. 3 shows the lateral motion resistance device of Patent No. 1,657,777, as aforesaid, which device is at the forward truck. It comprises rack-equipped upper and lower seats 32 and 33 respectively, and gear-equipped rollers 34. The device is interposed between the bolster 31 and the center pin-plate structure of the frame-superstructure unit. Thus the frame-superstructure unit and the truck are permitted ample relative lateral movement, and the inclination at which the seats are formed provides the required lateral motion resistance. The angle of this inclination preferably varies to produce the aforesaid low initial resistance and subsequent increasing resistance.

Fig. 7 shows diagrammatically a lower roller seat $f$ and a roller $g$ exemplifying an instance of varying seat inclinations, wherein the inclination at the central portion of the seat is less than elsewhere, this being more fully illustrated in the patent to Todd, No. 1,689,261, Fig. 3.

Fig. 6 shows the lateral motion resistance device of Patent No. 1,920,348, as aforesaid, but as the foregoing remarks regarding the construction and operation of the device shown in Fig. 3 apply with equal force here, further remarks would be a repetition. Suffice it is to say that the upper seat 35 is carried by the frame-superstructure unit and the lower seat is carried by the trailing truck frame at the rear thereof and that there is one of these devices at each rear corner. Thus the frame superstructure unit and the truck are permitted ample relative lateral movement.

Fig. 4 shows the lateral motion resistance device of Patent No. 1,946,893, as aforesaid. For convenience of illustration the device shown in Fig. 4 is considered as being located at the forward driving axle 5. A similar device is employed at each of the other laterally movable driving axles, in the present instance in the 4–8–4 type of locomotive shown in Figs. 1 and 2, the driving axles 6 and 7. It will be understood however that other types may be employed, for instance such as 4–6–4, 2–10–4 types, with appropriate application of the lateral motion resistance devices.

The device of Fig. 4 is made in two sections 36—36. Each comprises two spring supports 37 associated at their outer ends with the journal boxes 38 of the axle 5 and mounted at their inner ends on a common shaft 39 which extends well through the supports and is secured thereto by keys 40 to permit sliding movement between the shaft 39 and supports 37. Springs 41 are mounted on the supports with outer ends bearing against collars 42 formed integral with the supports and bearing at their inner ends upon a washer 43 mounted on the shaft midway thereof. The boxes 38 are mounted in the frame 2 to provide spaces $h$ whereby the boxes and axle may move laterally relative to the frame 2. Thus the frame-superstructure unit and the driving axle are permitted the required lateral movement.

Fig. 5 shows the lateral motion resistance device of Patent No. 2,021,167, as aforesaid, which is associated with trailing truck axle 24, one at each end thereof. Each device comprises a spring support 44 having its outer end secured to the journal box 45, or more strictly to the wall 46 of the cellar 47 of the box, a thrust block 48 opposite the adjacent end of the axle, the block being provided with a stem 49 mounted in the support, and a coil spring 50 mounted on the support and bearing at its outer end against the wall 46 and at its inner end against the block 48.

The journal box 45 is rigid with the frame 4, and the axle with its wheels is permitted to move laterally relative thereto, a suitable space $i$ between the wheel hub and journal box being provided to permit this.

It will be seen from the foregoing that by choosing springs 50 for the trailing truck and springs 41 for the various driving axles, 5, 6 and 7 of a predetermined strength, and by setting them under predetermined initial compression, the initial resistance, and increasing resistance as the lateral motion increases, of each spring device relative to the others and to the devices of Figs. 3 and 6, may be properly determined.

The stem 49 is provided with a nut 51 which limits the inward movement of the block 48 so that the spring 50 may, when assembled between the wall 46 and block 48, be given the desired amount of compression for the initial resistance required and similarly the springs 41 may, when assembled between the collars 42 and washer 43, be given the desired amount of compression for the initial resistance required. It is the natural function of these springs 41 and 50 to increase their resistance as they are increasingly compressed during the increasing lateral movements of their respective axles.

Wheels 11, 13 and 17 are the guiding wheels of the locomotive, wheels 18, 19 and 25 only carry weight, wheels 20 provide the frame-superstructure unit pivot point, as will later more fully appear, and wheels 27 are the rear end control wheels.

In accordance with the present invention it is desirable that the lateral motion resistance devices of the trucks and axles offer certain resistances and have certain actions, the combined resistances and actions tending to guide the forwardly advancing locomotive more properly through curved track.

To obtain this result it is desirable, for one thing, to have the lateral resistance offered by the trailing truck as a whole equal to about half the lateral resistance offered by the leading truck. The lateral resistance of the trailing truck is the result of the resistance offered by the springs of the devices 28, and by the rollers of the devices 29. The resistances of these devices can be determined, as is well known, by employing springs for the devices 28 of the proper strength and initial compression and by employing roller seats for the devices 29 of the proper inclinations to obtain the desired proportion of the vertical raising of the rollers in relation to their lateral rolling. The resistance of device 14 of the leading truck is controlled similarly to the resistance of the devices 29.

It is further desirable that the resistance devices of the leading and trailing trucks offer initial low resistance for the first portion of lateral movement, and thereafter increasing resistance, which increase is preferably constant. This is the natural action of the spring resistance devices employed, and therefore no detailed description is deemed necessary. Suffice it to say that if the spring of device 28 is given no, or but slight compression, then the initial resistance offered to initial or further compression, as the case may be, will be low. The resistance offered by the spring of course increases as the spring becomes further compressed, and this continues until the full required lateral movement is attained whereupon resistance becomes constant. The same result is obtained in the roller devices of the trailing and leading trucks by making the initial inclination of the roller seats less than the following inclination. As is well known, and as can be deduced from the foregoing, the resistance of the trailing truck acts against or deducts from the guiding resistance of the leading truck, and on the other hand the resistance of the leading truck, being the greater resistance, overcomes the resistance of the trailing truck. The initial resistance of the trailing truck devices is determined so that it is just sufficient to prevent vibration of the trailing truck on tangent track.

The resistance devices of the driving axes are all of the same type. However, the springs of the device 21 are, in order to obtain the aforementioned result, initially under a greater compression than the springs of devices 22 and 23, so that the initial resistance exerted against lateral movement of the first driving axle is greater than the initial resistance exerted against lateral movement of the second and third driving axles. A similar result may be obtained by using a stronger spring in device 21 than in devices 22 and 23. The resistance after initial resistance increases constantly in the case of all three driving axles, this being the natural outcome of the use of springs, and this continues until the full required lateral movement is attained, whereupon the resistance becomes constant.

The building up of these resistances in the guiding wheels 11, 13 and 17 from a low initial to the aforesaid increased constant provides the cushion when entering a curve and at the same time gives the equivalent effect of passing through a much longer radius curve, and eliminates the lateral jerking movements at the rear end which a high initial resistance produces when first entering the curve.

The pivot point about which the lever, formed of the frame and superstructure acting together as a unit, pivots, is the point $a$, which point is in the vertical center plane of the axle 8, at the point of contact between the flange of the wheel 20 and the inner rail $b$ of the curved track, the axle having no lateral movement relative to the frame. Of course the pivot point may be on either wheel 20, depending on which one is adjacent the inner rail of a curved track. Thus the lever has an effective short rear arm extending from the point $a$ rearward to the center of the axle 26, and an effective long arm extending from the point $a$ forward to, or a little in front of, the axle 12. The entire spring-suspended frame-superstructure unit can therefore turn freely about the point $a$.

When the locomotive enters or passes forwardly through curved track, the leading truck wheels and the forward driving wheels adjacent the outer rail $c$ of the curved track act as guiding wheels, the flanges thereof engaging the outer rail $c$, the leading truck moving laterally with the curve relative to the main frame in the direction of the inner rail and the driving axle 5 moving likewise. Driving axle 6 also moves laterally likewise with its wheel flange adjacent the outer rail in engagement therewith. The wheel flanges of the wheels of axles 7 and 8 adjacent the inner rail, however, are in engagement therewith, axle 7 moving laterally relative to the main frame in the direction of the outer rail. The trailing truck wheel flanges adjacent the outer rail are in engagement therewith, the forward axle 24 moving laterally relative to the trailing truck frame, which provides for lateral movement relative to the main frame, in the direction of the inner rail, and the rear end of the trailing truck and rear axle moving laterally relative to the main frame in the direction of the inner rail about the point $d$, which is the axis of the pivotal connection between the trailing truck and the main frame.

It will be seen from the above that the locomotive of the present invention can pass smoothly through curved track with a minimum of wheel flange pressures and twisting.

The longitudinal center of gravity of the locomotive is approximately at the point $e$. It is desirable to place as much of the load in front of the pivot point as is practical and this is accomplished in the present instance by placing the pivot point in the vertical center plane of the rear driving axle, which at the same time provides for a desirable maximum long lever arm, the beneficial guiding effect of the locomotive being influenced by the distance between the pivot point and the center of gravity and improving as this distance increases.

The leading truck and trailing truck, because of their flexible connections with the main frame and because of the provision made for lateral movement, are not forced into tight wheel flange engagement with the rails by the lever action of the frame and superstructure. Therefore it is only in the long wheel base of the driving axles that it would be expected to find excessively tight wheel flange engagement. However, the lever action, with its pivot point in the vertical center plane of the rear driving axle, together with the provision in the other driving axles for lateral movement, insures sufficient flexibility so that no excessive wheel flange pressures occur.

The results of the aforedescribed lever action are various. The wheels can all be flanged, therefore need not be overwide, and the tire setting can be made to the maximum width suitable for tangent track without further provision for track curvature requirements. Better locomotive guiding is obtained, eliminating any nosing and fore-and-aft lunging tendency, and consequently permitting a reduction in the percentage of reciprocating weights with a corresponding reduction in dynamic forces. Wheel flange pressures are equalized and reduced, eliminating wheel binding between rail and wheel hub, increasing the mileage life of tires and rails, thereby reducing the maintenance of the locomotive and right-of-way. The riding comfort of the locomotive is also improved due to the elimination of severe wheel flange thrusts. Because of the use of normal width flanged wheels, rolling resistance is reduced to a minimum. The flexibility of the lever structure in cooperation with the lateral motion of all wheels relative to the main frame but the pivot wheels enables the locomotive to pass over track of relatively sharp curvature with the same effect of passing over track of a curvature of a longer radius. This increases the operating safety of the locomotive and enables it to pass through curves at a greater speed.

In the foregoing description, particular types of lateral motion resistance devices have been referred to, but it is to be understood that this is by way of example only and that any suitable devices may be used in place of those chosen. The spring rigging of the locomotive, indicated generally by the reference numeral 30, may also be of another type if desired.

The invention claimed and desired to be secured by Letters Patent is:

1. A locomotive comprising a rigid main frame-superstructure unit; a leading truck supporting the forward end of said unit; a trailing truck supporting the rear end of said unit, said trucks having lateral movement relative to said unit; wheeled driving axles supporting said unit intermediate said trucks, one of said wheeled axles being fixedly connected to said frame against lateral movement relative thereto, and another of said wheeled axles being an intermediate wheeled axle disposed in advance of said fixed wheeled axle and being connected to said frame for lateral movement relative thereto; a lateral motion resistance device disposed at and associated with said intermediate wheeled axle providing a low initial resistance against said lateral movement of said intermediate wheeled axle and an increasing resistance as the lateral movement thereof increases, another of said wheeled axles being a forward wheeled axle disposed in advance of said intermediate wheeled axle and adjacent said leading truck and being connected to said frame for lateral movement relative thereto; a lateral motion resistance device disposed at and associated with said forward wheeled axle providing a low initial resistance against said lateral movement thereof, higher than the initial resistance of said first mentioned device, and further providing an increasing resistance as the lateral movement of said forward wheeled axle increases; and a lateral motion resistance device disposed at and associated with said leading truck providing a low initial resistance against said lateral movement of said leading truck and an increasing resistance as the lateral movement thereof increases, said wheeled axles and leading truck cooperating to provide, in entering curved track, a pivot at the point of meeting of the curved track inner rail with the flange of the wheel adjacent thereto on said fixed wheeled axle about which said unit turns under the pulling influence of said devices, said devices of said leading truck and forward wheeled axle exerting forces urging said unit at its forward end inwardly centrally of said curved track with increasing force as their resistance increases, whereby said leading truck and forward wheeled axle cooperate to guide said unit through said curved track.

2. A locomotive comprising a rigid main frame-superstructure unit; a leading truck supporting the forward end of said unit; a trailing truck supporting the rear end of said unit, said trucks having lateral movement relative to said unit; wheeled driving axles supporting said unit intermediate said trucks, the rearmost one of said wheeled axles being fixedly connected to said frame against lateral movement relative thereto, and another of said wheeled axles being an intermediate wheeled axle disposed in advance of said rearmost wheeled axle and being connected to said frame for lateral movement relative thereto; a lateral motion resistance device disposed at and associated with said intermediate wheeled axle providing a low initial resistance against said lateral movement of said intermediate wheeled axle and an increasing resistance as the lateral movement thereof increases, another of said wheeled axles being a forward wheeled axle disposed in advance of said intermediate wheeled axle and adjacent said leading truck and being connected to said frame for lateral movement relative thereto; a lateral motion resistance device disposed at and associated with said forward wheeled axle providing a low initial resistance against said lateral movement thereof, and further providing an increasing resistance as the lateral movement of said forward wheeled axle increases; and a lateral motion resistance device disposed at and associated with said leading truck providing a low initial resistance against said lateral movement of said leading truck and an increasing resistance as the lateral movement thereof increases, said wheeled axles and leading truck cooperating to provide, in entering curved track, a pivot at the point of meeting of the curved track inner rail with the flange of the wheel adjacent thereto on said rearmost wheeled axle about which said unit turns under the pulling influence of said devices, said devices of said leading truck and forward wheeled axle exerting forces urging said unit at its forward end inwardly centrally of said curved track with increasing force as their resistance increases, whereby said leading truck and forward wheeled axle cooperate to guide said unit through said curved track.

3. A locomotive comprising a rigid main frame-superstructure unit; a leading truck supporting the forward end of said unit; a trailing truck supporting the rear end of said unit, said trucks having lateral movement relative to said unit; wheeled driving axles supporting said unit intermediate said trucks, one of said wheeled axles being fixedly connected to said frame against lateral movement relative thereto, and another of said wheeled axles being an intermediate wheeled axle disposed in advance of said fixed wheeled axle and being connected to said frame for lateral movement relative thereto; a lateral motion resistance device disposed at and associated with said intermediate wheeled axle providing a low initial resistance against said lateral movement of said intermediate wheeled axle and an increasing resistance as the lateral movement thereof increases, another of said wheeled axles being a forward wheeled axle disposed in advance of said intermediate wheeled axle and adjacent said leading truck and being connected to said frame for lateral movement relative thereto; a lateral motion resistance device disposed at and associated with said forward wheeled axle providing a low initial resistance against said lateral movement thereof, higher than the initial resistance of said first mentioned device, and further providing an increasing resistance as the lateral movement of said forward wheeled axle increases; a lateral motion resistance device disposed at and associated with said leading truck providing a low initial resistance against said lateral movement of said leading truck and an increasing resistance as the lateral movement thereof increases, said wheeled axles and leading truck cooperating to provide, in entering curved track, a pivot at the point of meeting of the curved track inner rail with the flange of the wheel adjacent thereto on said fixed wheeled axle about which said unit turns under the pulling influence of said devices, said devices of said leading truck and forward wheeled axle exerting forces urging said unit at its forward end inwardly centrally of said curved track with increasing force as their resistance increases; and a lateral motion resistance device disposed at said trailing truck and associated therewith providing a resistance against said lateral movement thereof, whereby said leading truck and forward wheeled axle cooperate to guide said unit through said curved track, and said trailing truck operates as a rear end control for said unit.

4. A locomotive comprising a rigid main frame-superstructure unit; journal boxes housed in said frame; a plurality of wheeled axles forming the entire wheel base of said locomotive, some of said wheeled axles being wheeled driving axles and constituting a part of said wheel base disposed entirely beneath said rigid frame in which the driving axles are held in horizontal fixed angular relation relative to said rigid frame, said driving axles having ends journalled in said journal boxes; and means connecting the other of said wheeled axles with said unit and flexibly with said rigid frame for lateral movement relative thereto, the rearmost of said wheeled driving axles with its journal boxes being fixedly connected to said frame against lateral movement relative thereto and the remaining axles of said wheeled driving axles with their respective journal boxes having lateral movement relative to said frame, whereby when said locomotive is passing through curved track said rearmost wheeled driving axle will move as a unit with said frame, said wheeled axles cooperating to provide, in entering said curved track, a pivot at the point of meeting of the curved track inner rail with the flange of the wheel adjacent thereto on said fixed wheeled driving axle, said pivot being the only point of said entire wheel base which is fixed against lateral movement relative to said frame and which is adapted to serve as a pivot point thereof.

5. A locomotive comprising a rigid main frame-superstructure unit; journal boxes housed in said frame; a plurality of wheeled axles forming the entire wheel base of said locomotive, some of said wheeled axles being wheeled driving axles and constituting a part of said wheel base disposed entirely beneath said rigid frame in which the driving axles are held in horizontal fixed angular relation relative to said rigid frame, said driving axles having ends journalled in said journal boxes; means connecting the other of said wheeled axles with said unit and flexibly with said rigid frame for lateral movement relative thereto, the rearmost of said wheeled driving axles with its journal boxes being fixedly connected to said frame against lateral movement relative thereto and the remaining axles of said wheeled driving axles with their respective journal boxes having lateral movement relative to said frame, whereby when said locomotive is passing through curved track said rearmost wheeled driving axle will move as a unit with said frame, said wheeled axles cooperating to provide, in entering said curved track, a pivot at the point of meeting of the curved track inner rail with the flange of the wheel adjacent thereto on said fixed wheeled driving axle, said pivot being the only point of said entire wheel base which is fixed against lateral movement relative to said frame and which is adapted to serve as a pivot point thereof; and a device operatively connected to said unit and to one of said wheeled axles forward of said fixed wheeled axle exerting a force urging said unit at its forward end inwardly centrally of said curved track, the flange of the wheel of said operatively connected wheeled axle adjacent the curved track outer rail engaging said outer rail whereby said device acts against the resistance of said outer rail.

6. A locomotive comprising a rigid main frame-superstructure unit; a leading truck supporting the forward end of said unit; a trailing truck supporting the rear end of said unit, said trucks having lateral movement relative to said unit; wheeled driving axles supporting said unit intermediate said trucks, one of said wheeled axles being fixedly connected to said frame against lateral movement relative thereto, and another of said wheeled axles being an intermediate wheeled axle disposed in advance of said fixed wheeled axle and being connected to said frame for lateral movement relative thereto; a lateral motion resistance device disposed at and associated with said intermediate wheeled axle providing resistance against said lateral movement thereof, another of said wheeled axles being a forward wheeled axle disposed in advance of said intermediate wheeled axle and adjacent said leading truck and being connected to said frame for lateral movement relative thereto; a lateral motion resistance device disposed at and associated with said forward wheeled axle providing resistance against said lateral movement thereof; and lateral motion resistance devices disposed at and associated with said trucks providing resistance against said lateral movements thereof, said wheeled axles and said trucks cooperating to provide, in entering curved track, a pivot at the point of meeting of the curved track inner rail with the flange of the wheel adjacent thereto on said fixed wheeled axle about which said unit turns under the pulling influence of said devices, said devices of said leading truck and forward wheeled axle exerting forces urging said unit at its forward end inwardly centrally of said curved track, whereby said leading truck and forward wheeled axle cooperate to guide said unit through said curved track.

7. A locomotive comprising a rigid main frame-superstructure unit; journal boxes housed in said frame; unit-supporting wheeled driving axles having ends journalled in said journal boxes, one of said wheeled axles with its journal boxes being fixedly connected to said frame against lateral movement relative thereto, and a plurality of said wheeled driving axles with their respective journal boxes being disposed in advance of said fixed wheeled axle, and being connected to said frame for lateral movement relative thereto, the foremost of said plurality of wheeled driving axles being the locomotive forward wheeled driving axle; and a lateral motion resistance device disposed at and associated with said wheeled driving axles of said plurality of wheeled driving axles, the flanges of the wheels of said driving axles being uniformly set to the maximum width suitable to tangent track and the resistances of the respective devices being predetermined to substantially equalize the pressures of the rail-engaging wheel flanges when entering and passing through curved track to minimize binding of said wheels between their hubs and engaged rail, said wheeled axles cooperating to provide, in entering curved track, a pivot at the point of meeting of the curved track inner rail with the flange of the wheel adjacent thereto on said fixed wheeled axle about which said unit turns under the pulling influence of said devices, said device of said forward wheeled axle exerting a force urging said unit at its forward end inwardly centrally of said curved track.

8. A locomotive comprising a rigid main frame-superstructure unit; a leading truck supporting the forward end of said unit; a trailing truck supporting the rear end of said unit, said trucks providing for lateral movement of their axles relative to said unit; wheeled driving axles supporting said unit intermediate said trucks, one of said wheeled driving axles being fixedly connected to said frame against lateral movement relative thereto, another of said wheeled driving axles being an intermediate wheeled driving axle disposed in advance of said fixed wheeled driving axle and being connected to said frame for lateral movement relative thereto, and another of said wheeled driving axles being a forward wheeled driving axle disposed in advance of said intermediate wheeled driving axle and adjacent said leading truck and being connected to said frame for lateral movement relative thereto, said wheeled driving axles and leading truck cooperating to provide, in entering curved track, a pivot at the point of meeting of the curved track inner rail with the flange of the wheel adjacent thereto on said fixed wheeled driving axle about which said unit turns, the leading truck and forward wheeled driving axle providing guiding axles for said unit when entering curved track; and lateral motion resistance devices associated with various of said laterally moving axles including said guiding axles, the resistance afforded by the devices for said guiding axles being substantially higher than the resistance afforded by the other devices, whereby said devices of said guiding axles exert maximum forces urging said unit at its forward end inwardly centrally of said curved track in guiding said unit therethrough.

9. A locomotive comprising a rigid main frame-superstructure unit; a four-wheel leading truck supporting at its center the forward end of said unit; a four-wheel trailing truck supporting the rear end of said unit, said trucks having lateral movement relative to said unit; wheeled driving axles supporting said unit intermediate said trucks, the rearmost one of said wheeled driving axles being adjacent the trailing truck and fixedly connected to said frame against lateral movement relative thereto, the other of said wheeled driving axles being in advance thereof and having lateral movement relative to said unit; lateral motion resistance devices for said other wheeled driving axles and for said trucks, said forward wheeled driving axle and leading truck devices being of sufficiently higher resistance relative to the other devices to constitute of said leading truck and forward wheeled driving axle the guiding means for guiding said unit through curved track, and of said trailing truck the rear end control of said unit, said wheeled driving axles and trucks forming a wheel base which provides of said unit a lever when passing through curved track, extending substantially from the trailing truck rear axle to a point forwardly of the leading truck rear axle substantially mid-way between the leading truck forward axle and the forward wheeled driving axle, and having for its pivot the point of meeting of the curved track inner rail with the flange of the wheel adjacent thereto on said fixed wheeled driving axle, said devices acting upon said lever to freely turn said unit about said pivot urging said unit forward end inwardly centrally of said curved track.

JAMES G. BLUNT.